United States Patent
Buchmayer et al.

(10) Patent No.: US 8,983,462 B2
(45) Date of Patent: Mar. 17, 2015

(54) ACCESS CONTROL FOR TERMINALS IN UTRAN FEMTO SYSTEM

(75) Inventors: Mats Buchmayer, Stockholm (SE); Tomas Nylander, Varmdo (SE); Jari Vikberg, Jarna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 569 days.

(21) Appl. No.: 13/120,379

(22) PCT Filed: Jul. 1, 2009

(86) PCT No.: PCT/SE2009/050848
§ 371 (c)(1),
(2), (4) Date: Mar. 22, 2011

(87) PCT Pub. No.: WO2010/036181
PCT Pub. Date: Apr. 1, 2010

(65) Prior Publication Data
US 2011/0177814 A1    Jul. 21, 2011

Related U.S. Application Data

(60) Provisional application No. 61/099,230, filed on Sep. 23, 2008.

(51) Int. Cl.
*H04W 4/00* (2009.01)
*H04W 48/02* (2009.01)
(Continued)

(52) U.S. Cl.
CPC ............ *H04W 48/02* (2013.01); *H04L 63/104* (2013.01); *H04W 12/08* (2013.01); *H04W 4/08* (2013.01); *H04W 84/045* (2013.01); *H04W 88/16* (2013.01)
USPC ..... 455/435.1; 455/410; 455/411; 455/432.3; 455/525

(58) Field of Classification Search
USPC ........ 455/410, 411, 432.3, 433, 435.1, 435.2, 455/525
See application file for complete search history.

(56) References Cited

U.S. PATENT DOCUMENTS

2007/0113086 A1* 5/2007 Huang et al. ................... 713/168
2007/0270152 A1 11/2007 Nylander et al.
(Continued)

OTHER PUBLICATIONS

3GPP TSR-RAN WG3 meeting #60 report, Kineto Wireless inc, ALU, NEC, Motorola, "Paging Related Issues and Solutions for 3G HNB Deployments", May 5-9, 2008, 4 pages.*
(Continued)

*Primary Examiner* — Rafael Pérez-Gutiérrez
*Assistant Examiner* — Thai Vu
(74) *Attorney, Agent, or Firm* — Coats & Bennett, PLLC

(57) ABSTRACT

The teachings herein provide authorization control enabling the co-existence of legacy mobile terminals (20) that do not support Closed Subscriber Groups (CSGs), and non-legacy mobile terminals (20) that do. New behaviors are defined for a CSG femtocell base station (10) (referred to as a Home NodeB or HNB), and for a base station gateway (14) (referred to as a HNB Gateway or HNB GW) that couples the HNB (10) to a Core Network (CN) (22). The HNB (10) and/or the HNB GW (14) determine whether a terminal (20) attempting to gain connection through the HNB (10) supports CSGs. If not, the HNB GW (14) performs access control and rejects the connection attempt if authorization fails. If the terminal (20) is recognized as supporting CSGs, the HNB GW (14) defers access control to the CN (22) by automatically accepting registration/connection requests from the HNB (10) for CSG-capable terminals (20). In such cases, the CN (22) is relied upon for access control, including any CSG authorization of the terminal (20). The HNB GW (14) indicates to the CN (22) whether or not access control was performed for the terminal (20).

2 Claims, 7 Drawing Sheets

(51) Int. Cl.
*H04L 29/06* (2006.01)
*H04W 12/08* (2009.01)
*H04W 4/08* (2009.01)
*H04W 84/04* (2009.01)
*H04W 88/16* (2009.01)

(56) References Cited

U.S. PATENT DOCUMENTS

| 2008/0076425 | A1 | 3/2008 | Khetawat et al. | |
|---|---|---|---|---|
| 2008/0181178 | A1* | 7/2008 | Shaheen | 370/331 |
| 2009/0070694 | A1* | 3/2009 | Ore et al. | 715/764 |

OTHER PUBLICATIONS

3rd Generation Partnership Project. 3GPP TR R3.020, v0.9.0 (Sep. 2008). 3rd Generation Partnership Project; Technical Specification Group Radio Access Network; Home (e)NodeB; Network aspects (Release 8), Sep. 2008.

3rd Generation Partnership Project. "Access Control for 3G HNB Deployments." 3GPP TSG-RAN WG3 Meeting #60, R3-081176, Kansas City, USA, May 5-9, 2008.

3rd Generation Partnership Project. "UE Registration and Access Control for UTRA HNBs." 3GPP TSG-RAN WG3 Ad Hoc, R3-081658, Sophia Antipolis, France, Jun. 11-12, 2008.

3rd Generation Partnership Project. "Text Proposal for UE Registration." 3GPP TSG-RAN WG3 #61, R3-082386, Jeju, Korea, Aug. 18-22, 2008.

3rd Generation Partnership Project. "Clarification on Non-CSG HNB." 3GPP TSG-RAN WG3 Meeting #63, R3-090993, Seoul, Korea, Mar. 23-26, 2009.

3rd Generation Partnership Project. "Paging Related Issues and Solutions for 3G HNB Deployments." 3GPP TSG-RAN WG3 Meeting #60, R3-081177, Kansas City, USA, May 5-9, 2008.

3rd Generation Partnership Project. "UE Access Control and UE Registration." 3GPP TSG RAN WG3 meeting #61, R3-082028, Jeju, Korea, Aug. 18-22, 2008.

* cited by examiner

ACCESS CONTROL FOR TERMINALS IN UTRAN FEMTO SYSTEM

TECHNICAL FIELD

The present invention generally relates to user equipment accessing communication networks through femtocells, such as Home NodeBs, and particularly relates to access control procedures associated with providing such access.

BACKGROUND

Specification work is ongoing by the Third Generation Partnership Project (3GPP) for home base stations in Wideband CDMA/Universal Terrestrial Radio Access Networks (WCDMA/UTRAN) and in E-UTRAN (Evolved UTRAN), which is the next generation of Radio Access Network (RAN). These specifications contemplate using a UTRAN base station to provide home or small area coverage for a limited number of users. The Home Node B (HNB) would provide normal coverage for its end users and would be connected to a mobile core network via a Home NodeB Gateway (HNB GW) using some kind of IP based transmission. The coverage provided by such an arrangement is called femtocell in this document.

One of the main drivers of this new concept of providing Local Access is to provide cheaper call or transaction rates/charges when connected via the HNB, as compared to when connected via the Node B—i.e., it may be cheaper to connect to a wireless communication service provider's core network using an IP-based link provided by a local access point, than to connect through a wide-coverage base station in the provider's cellular network.

The HNB would, in most cases, use the end user's already existing broadband connection (e.g. xDSL, Cable) to achieve connectivity to the mobile operator's HNB Gateway (HNB GW). Over the broadband connection and other possible intermediate IP networks (e.g. the internet), a HNB communicates with the HNB GW in the operator's network via an IPsec tunnel (Internet Protocol security architecture according to RFC 4301). The IPsec tunnel, which is established between the HNB and a Security Gateway (SEGW), protects the border of the operator's network and the communication between the HNB and the HNB GW.

Further, the E-UTRAN standards for 3GPP Release-8 introduce the concept of Closed Subscriber Groups, referred to as CSGs. Later releases of the UTRAN standards also may adopt the CSG concept. Also several 3GPP working groups are currently conducting research and discussions on approaches that can be adopted for access controls of CSGs. In any case, with CSG, particular HNBs can be associated with certain mobile terminals, or other user equipment (UE), meaning that only the associated terminals are allowed to access the HNB(s). The allowed CSGs are stored in a given terminal, in a so called CSG Whitelist (that is also known as Allowed CSG List). Each HNB broadcasts a "CSG Indicator" and the CSG Identity allocated to it in System Information (SI). Thus, a terminal that "hears" a CSG being broadcast by a given HNB can determine whether the broadcasted CSG identity matches a CSG identity in the CSG Whitelist stored in the terminal. If so, the terminal knows that it is allowed to access that HNB.

The 3GPP requirements are that the "owner" of the HNB (or, equivalently, a Home eNodeB, HeNB) shall, under network operator supervision, be able to add, remove and view the list of CSG members. Because of this CSG-based access control arrangement, additional authorization control shall be performed in the operator's Core Network (CN). That is, for CSG terminals, the CN can check the CSG ID with UE Identity, to decide whether a given UE (terminal) should or should not be allowed access to a particular CSG.

However, a major difference in CSGs between the E-UTRAN and UTRAN standards relates to "legacy" issues. Because 3GPP Release-8 is the first release for E-UTRAN and it includes CSG support from the outset, there will be no legacy E-UTRAN UEs that do not support CSG. The case is different, however, for UTRAN, as previous releases of the UTRAN standard did not support CSG (e.g., Release-99). As such, UTRAN/3G HNB solutions will need to work with UEs that support CSG, and with those that do not.

The standardization work in 3GPP for UTRAN/3G HNB solutions is currently two-fold. The 3GPP TSG RAN3 is working with a solution that will support legacy UEs. In addition, it is also assumed that solutions supporting CSG-capable UEs will be standardized, either in Release-8 and/or in Release-9. Particularly, in UTRAN HNB standardization it has been agreed to introduce a UE registration procedure to support the access control in HNB GW for legacy terminals, i.e. terminals that do not support the CSG concept.

SUMMARY

Among its several advantages, the teachings in this document provide an access control that enables the co-existence of legacy UEs that do not support Closed Subscriber Groups (CSGs), and non-legacy UEs that are CSG capable. According to one or more embodiments disclosed herein, methods are provided to enable the simultaneous support for both legacy UEs and non-legacy UEs. Example UEs include mobile terminals, also referred to as mobile stations, such as cellular telephones.

In one or more embodiments, new behavior is defined for a femtocell base station that supports CSGs, and for a network gateway providing Core Network (CN) access to such base stations. For convenience, CSG-capable femtocell base stations are hereinafter referred to as HNBs, and the associated base station gateways are referred to as HNB GWs, and this terminology encompasses Home eNodeBs (HeNB) and HeNB GWs. According to the new behavior, the HNB GW does not perform access control for a mobile terminal attempting to connect through the HNB, if the mobile terminal is indicated as supporting CSGs. In such cases, the HNB GW defers to the CN for access control, including CSG authorization of the mobile terminal. On the other hand, if the mobile terminal is not indicated as supporting CSGs, the HNB GW performs access control of the mobile terminal.

At least one embodiment of the above method uses UE capabilities and/or release indicators as a basis for determining CSG support (or the lack thereof), and introduces signaling to network nodes that enables differentiated handling of terminals based on whether the terminals support CSGs. Broadly, the HNB GW does not perform access control for terminals that are indicated as supporting CSGs, but does perform access control for terminals that are not indicated as supporting CSGs. (Such access control may be based on the HNB ID and the UE IMSI, for example.) In at least one embodiment, a terminal attempting connection through a HNB includes an "Access stratum release" indicator or a "UE capability" indicator in its initial connection signaling. Correspondingly, the HNB and/or the HNB GW are configured to recognize or otherwise determine from such an indicator whether the terminal supports CSGs. The HNB GW does not perform access control for terminals indicated as supporting CSGs, but does perform access control for terminals that are not indicated as supporting CSGs.

Still referring to the above mentioned indicators, in one embodiment, the HNB includes the Access stratum or UE capabilities indicator in registration/connection signaling sent to the HNB GW, which is configured to determine from the indicator whether the terminal attempting connection does or does not support CSGs. In another embodiment, the HNB evaluates the indicator and uses different registration/connection signaling to the HNB GW for CSG-capable terminals, as compared to non-CSG-capable terminals.

In at least one such embodiment, the HNB is configured to send connection messages to the HNB GW without first sending registration request messages to the HNB GW, for mobile terminals indicated as supporting CSGs. In turn, the HNB GW is configured to recognize whether the terminal does or does not support CSGs based on such differentiated signaling from the HNB. For example, one embodiment of the HNB GW recognizes receipt of a connection message for a mobile terminal without first receiving a registration request for that terminal as an implicit indication that the terminal supports CSGs. In still other embodiments, an explicit indicator or explicit messages identifying CSG support (or lack thereof) can be used.

With these aspects in mind, one embodiment presented herein provides a method of access control at a HNB GW coupling a HNB to a core network (CN). The method comprises receiving a registration or connection message at the HNB GW for a mobile terminal attempting to attach to the CN through the HNB, and determining explicitly or implicitly from the message whether the mobile terminal is CSG-capable. If the message indicates that the mobile terminal is CSG-capable, the HNB GW relays the connection request on to the CN without performing access control. The CN performs its ordinary access control procedures for the terminal, including CSG authorization, as appropriate. On the other hand, if the message does not indicate that the mobile terminal is CSG-capable, the HNB GW performs access control and relays the connection request on to the CN if the terminal is authorized, and otherwise rejects the terminal's connection attempt.

Correspondingly, the teachings herein provide a HNB GW configured to support closed subscriber group (CSG) access at an associated HNB and to couple the HNB to a CN. In one or more embodiments, the HNB GW comprises one or more processing circuits configured to receive a registration or connection message for a mobile terminal attempting to attach to the CN through the HNB and determine whether the message indicates that the mobile terminal is CSG-capable. The processing circuits are further configured such that, if the message does indicate that the mobile terminal is CSG-capable, access control is skipped, or otherwise automatically passed, and the registration/connection signaling is relayed to the CN, thus deferring to the CN for access control, including any CSG authorization processing. On the other hand, if the message does not indicate that the mobile terminal is CSG-capable, the HNB GW's processing circuits determine whether the mobile terminal is allowed to access the HNB—i.e., access control is performed at the HNB GW for the mobile terminal. If access control processing determines that the mobile terminal is authorized, the HNB GW's processing circuits relay the connection request signaling for the terminal on to the CN for any further, CN-based authorization of the mobile terminal. However, if the mobile terminal fails the HNB GW's access control processing, the HNB GW's processing circuits reject connection of the mobile terminal to the HNB.

Complementing the above embodiments and variations of them, the teachings herein also provide a method of closed subscriber group (CSG) access control at a HNB that is coupled to a core network (CN) through a base station gateway. The method comprises receiving an attachment or connection message from a mobile terminal attempting to attach to the CN through the HNB and determining whether the message indicates that the mobile terminal is CSG-capable. For example, as part of initial Radio Resource Control (RRC) signaling, a mobile terminal sends a UE capability indicator and/or release indicator to an HNB, where the indicator indicates that the UE is CSG-capable, or at least can be recognized by the HNB as indicating CSG support.

If the message indicates that the mobile terminal is CSG-capable, the HNB implicitly or explicitly signals that capability to the base station gateway as part of initiating connection signaling with the base station gateway. For example, the HNB includes the terminal's capability indicator or other such indicator in a registration message sent to the base station gateway. In another example, the HNB alters, e.g. slightly, the registration/connection signaling sent to the HNB GW in dependence on whether the terminal does or does not support CSGs. In such embodiments, the HNB GW is configured to recognize whether the terminal does or does not support CSGs based on the differentiated connection signaling from the HNB.

Further, in at least one such embodiment, the HNB is configured to obtain a (permanent) mobile terminal identifier from the terminal, if the terminal's initial connection messages did not include one, and do not indicate CSG capability. This processing is used because the mobile's permanent identifier—e.g., its International Mobile Subscriber identity (IMSI)—will be used for access control processing by the HNB GW. Thus, the method further includes sending the permanent mobile terminal identifier from the HNB to the HNB GW, for use by the HNB GW in carrying out access control authorization of the mobile terminal. Thus, one or more embodiments presented herein include a HNB comprising processing circuits configured to implement the above HNB methods.

Of course, the present invention is not limited to the above summarization of selected features and advantages. Indeed, those skilled in the art will recognize additional features and advantages from the following detailed discussion and the included drawings.

DETAILED DESCRIPTION

According to this detailed discussion, a HNB supports CSGs, wherein UE access to the HNB is restricted according to a CSG white list. The HNB is communicatively coupled to a CN through a HNB GW and, according to the teachings herein, the HNB and/or HNB GW determine whether a given mobile terminal attempting access through the HNB supports CSGs. In one embodiment, the HNB makes the determination and explicitly or implicitly signals that determination to the HNB GW. In another embodiment, the HNB provides information to the HNB GW—e.g. a capability indicator for the terminal—that allows the HNB GW to make the determination.

In either case, the HNB GW is configured to defer access control to the CN, for terminals that are CSG capable. Put another way, the HNB GW automatically accepts registration/connection requests for terminals that are indicated as supporting CSGs, and relays or passes along the connection request signaling to the CN, thus relying on the CN to perform access control for the terminal, including any CSG-based authorization of the terminal. Conversely, the HNB GW performs access control for terminals that are not indicated as supporting CSGs. In such cases, a given terminal's attempt to access the CN through the HNB will be rejected if the terminal fails access control processing by the HNB GW.

The above behaviors provide certain efficiencies because, as a general proposition, CSG-capable mobile terminals will not attempt to gain access through a given HNB unless there is a white list match. Thus if a given terminal attempting connection through a given HNB is indicated as supporting CSGs, then it is both efficient and appropriate to defer to the CN for both access control processing, given the CN's ready access to CSGs white list and subscriber authorization information. However, for mobile terminals that are not indicated as supporting CSGs, it is more efficient to perform access control at the HNB GW, because doing so avoids needlessly invoking connection signaling with the CN for terminals that may well not be authorized to gain access through the HNB.

Figure 1:
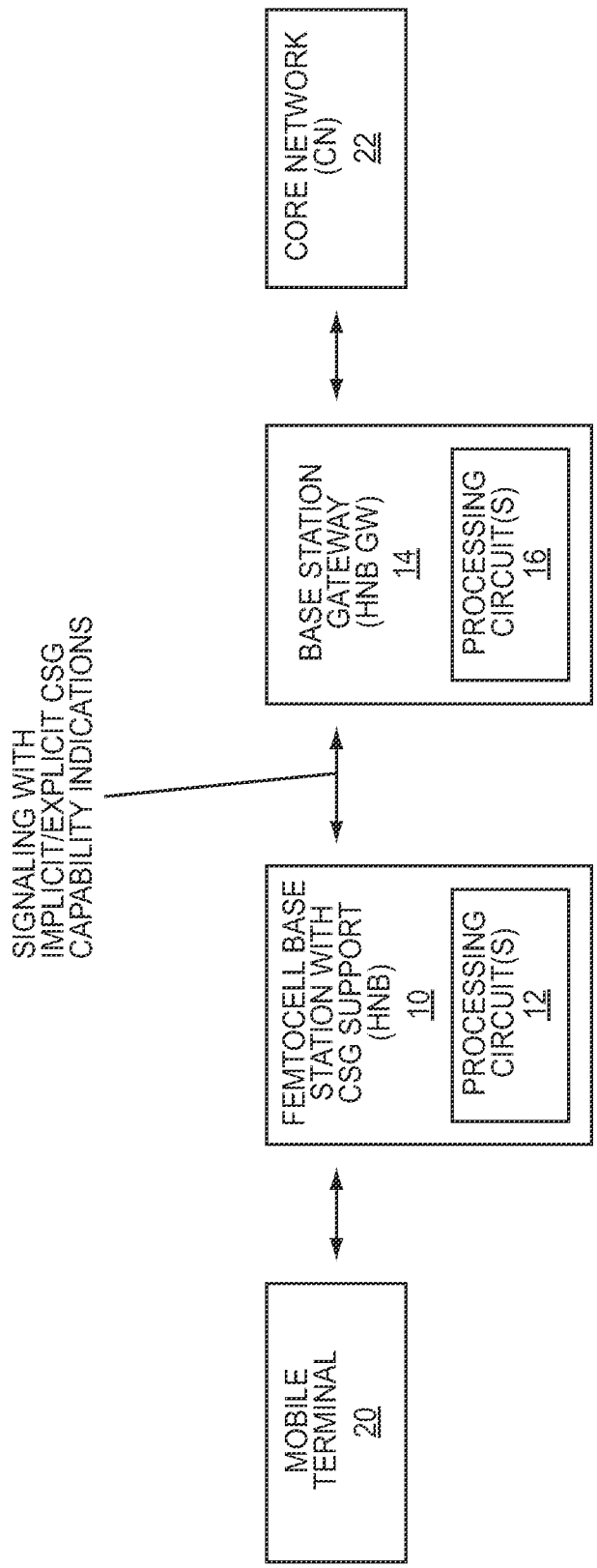
FIG. 1 is a block diagram of an embodiment of a HNB, and associated base station gateway, illustrated in context with a Core Network (CN) and a mobile terminal.

In supporting the above processing, the HNB and the HNB GW each include one or more processing circuits configured to carry out the HNB and HNB GW processing, respectively, that is presented herein. FIG. 1 illustrates a non-limiting example of the above-described HNB, HNB GW, and their respectively associated processing circuits.

The illustrated HNB 10 includes supporting processing circuits 12, and the illustrated HNB GW 14 includes supporting processing circuits 16. The HNB 10 provides access for one or more mobile terminals 20 to a CN 22 of a wireless communication system. Those skilled in the art will appreciate that the illustrated processing circuits 12 and 16 each may comprise one or more associated microprocessor/computer circuits. For example, the HNB's processing circuits 12 may comprise one or more computer systems that are configured to execute stored program instructions (in the form of one or more computer programs/computer functions). The HNB 10 also may include memory or other storage devices, for storing provisioning information that supports HNB operations. Likewise, the HNB GW's processing circuits 16 may comprise one or more microprocessor/computer systems, and the HNB GW 14 generally includes or is associated with storage devices or circuits containing a variety of provisioning information, such as information needed for access control processing.

Figure 2:
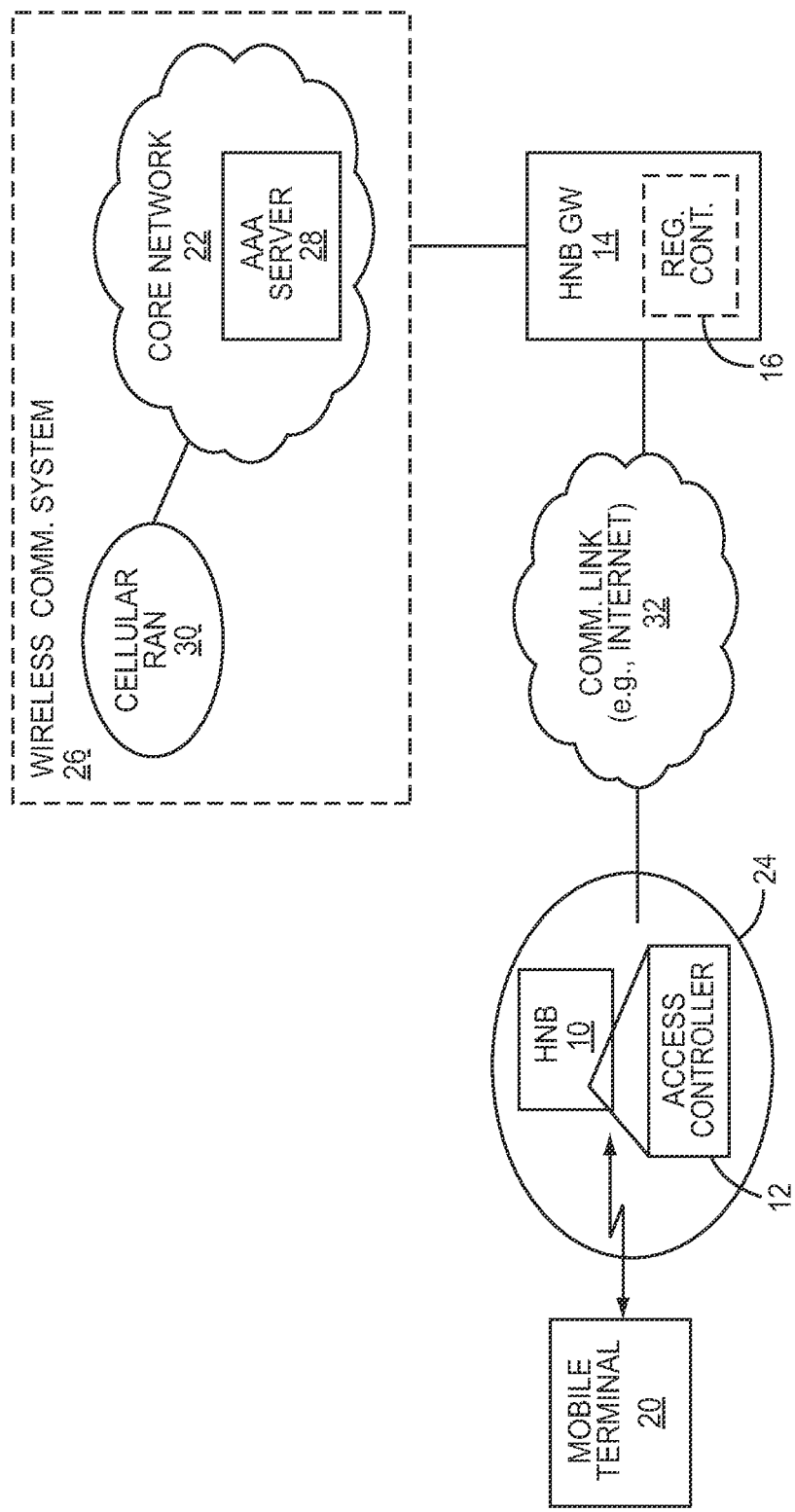
FIG. 2 is a block diagram of an embodiment of a HNB and associated base station gateway, configured as a femtocell access node and network gateway, illustrated in context with a wireless communication system that includes a CN.

FIG. 2 provides a more detailed example illustration for the HNB 10 and HNB GW 14 introduced in FIG. 1. The previously described processing circuits 12 of the HNB 10 are generally referred to herein as an access controller 12, and the HNB 10 is shown as providing radio coverage over a femtocell coverage area 24. It will be understood that the HNB 10 is configured to interface a number of mobile terminals 20—only one is shown for convenience—with the HNB GW 14. In turn, the HNB GW 14 provides access to the CN 22. Here, the CN 22 is shown in context with a wireless communication system 26, and it includes, among other things, an Authorization/Admission/Accounting (AAA) server 28. In one or more embodiments, the AAA server 28 performs or otherwise supports CN-based access control for mobile terminals 20. Of course, the CN 22 may include a variety of other entities not germane to this discussion, such as Mobile Switching Centers (MSCs) and Service GPRS Support Nodes (SGSNs).

With the illustrated arrangement, a given mobile terminal 20 has two mechanisms for accessing the CN 22. Namely, the terminal 20 accesses the CN 22 through a given HNB 10, or through cellular signaling with a Radio Access Network (RAN) 30, as provided by the wireless communication system 26. As a general proposition, the HNB 10 will have a communication link 32 to the HNB GW 14, e.g., a broadband Internet/IP connection, and thus may provide less expensive access to the CN 22, as compared to cellular access via the RAN 30.

In any case, the HNB 10, which includes the aforementioned access controller 12, is configured to receive a connection request from a given mobile terminal 20 desiring access to the CN 22. The connection signaling from the terminal 20 to the HNB 10 may include an indication as to whether the terminal 20 supports CSGs. For example, such signaling may include an Access stratum release indicator, or a UE capabilities indicator. Correspondingly, either or both the HNB 10 and the HNB GW 14 can be configured to recognize whether a given terminal 20 supports CSGs based on the value of such an indication. Alternatively, an explicit CSG support indicator may be provided by the terminal 20.

In one or more embodiments, the HNB 10 is configured to recognize from such an indicator as to whether a given terminal 20 supports CSGs. If the terminal 20 does, the HNB 10 sends a connect message to the HNB GW 14 without first sending a registration request for the terminal 20 to the HNB GW 14. That is, if the HNB 10 determined that the terminal 20 was not indicated as supporting CSGs, it would first send a registration request message to the HNB GW 14, and then wait for registration acceptance before sending the connect message. Complementing this differentiated signaling by the HNB 10, in a corresponding HNB GW embodiment, the HNB GW 14 is configured to recognize the receipt of a connect message for a mobile terminal 20 from the HNB 10, without first receiving a registration request from the HNB 10 for that mobile terminal 20, as an implicit indication that the terminal 20 supports CSGs.

In such embodiments, the HNB GW 14 defers access control to the CN 22 for terminals 20 (implicitly) indicated by the HNB 10 as supporting CSGs. On the other hand, the HNB GW 14 performs access control for mobile terminals 20 not indicated as supporting CSGs. Note, too, that in at least one such embodiment, the HNB 10 is configured to request a (permanent) mobile terminal identifier from a given mobile terminal 20 attempting connection through the HNB 10, if the terminal 20 is not indicated as supporting CSGs and if the terminal 20 did not provide such an identifier in its initial connection signaling toward the HNB 10. The HNB 10 provides the terminal identifier to the HNB GW 14, e.g., in a registration request message, so that the HNB GW 14 can identify the terminal 20 for carrying out access control-based connection authorization.

In one or more other embodiments, the HNB GW 14 is relied upon to recognize whether a given terminal 20 attempting connection through the HNB 10 supports CSGs. For example, the HNB GW 14 may be configured to make that determination based on recognizing whether an Access stratum release indicator, a UE capabilities indicator, or other such indicator, has a value corresponding to a terminal type that supports CSGs.

In one or more such embodiments of the HNB GW 14, the HNB 10 is correspondingly configured to receive such an indicator from a connecting mobile terminal 20, and to pass it along to the HNB GW 14 as part of the registration/connection signaling sent from the HNB 10 toward the HNB GW 14. For example, the HNB 10 receives an Access stratum release indicator or a UE capabilities indicator from a connecting terminal 20, and passes that indicator along to the HNB GW 14, as part of a registration request message sent to the HNB GW 14 by the HNB 10 for the terminal 20. Thus, it will be understood that, in one or more embodiments, a mobile terminal 20 attempting to gain connection to the CN 22 through a given HNB 10/HNB GW 14 includes an indication in its connection signaling that is used by the HNB 10 and/or the HBN GW 14 to determine whether the terminal 20 supports CSGs.

In any case, with continuing reference to FIG. 2, the HNB GW 14 is configured to interface a number of HNBs 10 to the CN 22 in the wireless communication system 26, thus providing access to the CN 22 for mobile terminals 20 connecting through any of the HNBs 10. Therefore, in the context of FIG. 2, the HNB GW 14 should be understood as providing connectivity to the CN 22 for any given number of HNBs 10, and each HNB 10 should be understood as providing support for any given number of mobile terminals 20.

Supporting this capability, the processing circuits 16 of the HNB GW 14 operate as a registration controller (hereinafter referred to as registration controller 16) that is configured to perform access control for mobile terminals 20 that are not indicated as supporting CSGs, and to defer access control to the CN 22, for mobile terminals 20 that are indicated as supporting CSGs. In at least one embodiment, the registration controller 16 is configured to receive registration requests from given ones of the HNBs 10, for mobile terminals 20 attempting to gain access through those HNBs 10, and is configured to determine whether a given mobile terminal 20 supports CSGs.

In another embodiment, the HNB 10 includes a CSG identifier (ID) in registration/connection signaling to the HNB GW 14, for a CSG-capable terminal, and the HNB GW 14 is configured to recognize the terminal 20 as being CSG capable, based on that inclusion. In another embodiment, the HNB 10 receives a UE capabilities indicator or an Access stratum release indicator from a terminal 20 attempting connection through the HNB 10, and the HNB 10 passes that indication along the connection signaling towards the HNB GW 14. Correspondingly, the HNB GW 14 is determined to recognize from the indicator(s) whether the terminal 20 supports CSGs. In still other embodiments, some other indicator is included in the connection signaling triggered from the HNB 10 towards the HNB GW 14, by a mobile terminal 20 attempting to connect to the CN through the HNB 10.

In any case, in one or more embodiments of the HNB GW 14, the registration controller 16 is configured to perform access control for mobile terminals 20 that are not indicated as supporting CSGs and to defer access control to the CN 22 for mobile terminals 20 that are indicated as supporting CSGs. As noted, deferring access control to the CN 22 for CSG-capable terminals 20 comprises, in one or more embodiments, the HNB GW 14 automatically accepting registration/connection requests sent from the HNB 10 for CSG-capable terminals 20. Thus, deferring access control to the CN 22 for mobile terminals 20 that are indicated as supporting CSGs can be understood as the HNB GW 14 automatically authorizing such terminals. Conversely, performing access control at the HNB GW 14 for terminals 20 that are not CSG capable can be understood as the HNB GW 14 actually determining (on its own or with assistance from one or more other entities/databases) whether a particular terminal 20 has (CSG) authorization to connect through the given HNB 10. Such access control may be based on the UE IMSI and the HNB ID, and for registration procedures and associated signaling examples one may refer to the 3GPP Technical Specification TS 25.467, "UTRAN architecture for 3G Home Node B (HNB); Stage 2", and the 3GPP TS 25.469, "UTRAN Iuh interface Home Node B (HNB) Application Part (HNBAP) signaling". Thus, in one or more embodiments, the HNB GW 14 implements a method wherein it: (1) receives registration requests from given HNBs 10, for mobile terminals 20 attempting to gain access to the CN 22 through any one of the given HNBs 10; (2) sends connection requests to the CN 22, without performing access control at the HNB GW 14, responsive to registration requests received for mobile terminals 20 that are indicated as supporting CSGs; and (3) sends connection requests to the CN 22, subject to performing access control at the HNB GW 14, responsive to registration requests received for mobile terminals 20 that are not indicated as supporting CSGs.

Correspondingly, in one or more embodiments, the HNB GW 14 is configured to indicate to the CN 22 whether access control has or has not been performed at the HNB GW 14 for a given mobile terminal 20 that is attempting to gain access to the CN 22 through the HNB GW 14. Doing so ensures that the CN 22 is aware that access control should be performed for the given mobile terminal 20.

The above configurations, and variations of them, should be understood as broadly providing for a method of interfacing femtocells through a network gateway to a core network of a wireless communication system, to provide access to the core network for mobile terminals connecting through the femtocells. Such a method includes performing access control in the network gateway, for mobile terminals that are not indicated as supporting CSGs, and deferring access control to the core network, for mobile terminals that are indicated as supporting CSGs. For example, the registration controller 16 in the HNB GW 14 is configured to perform access control for non-CSG mobile terminals 20 attempting to connect to the CN 22, and to defer access control processing to the CN 22, for mobile terminals 20 that do support CSGs.

Figure 4:
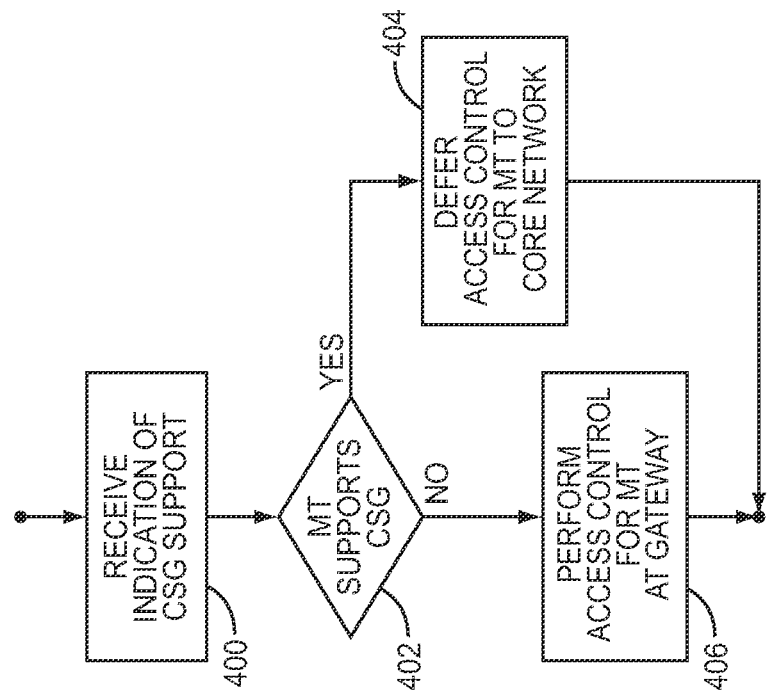
FIG. 4 is a logic flow diagram of one embodiment of HNB Gateway (HNB GW) processing as contemplated herein.
Figure 3:
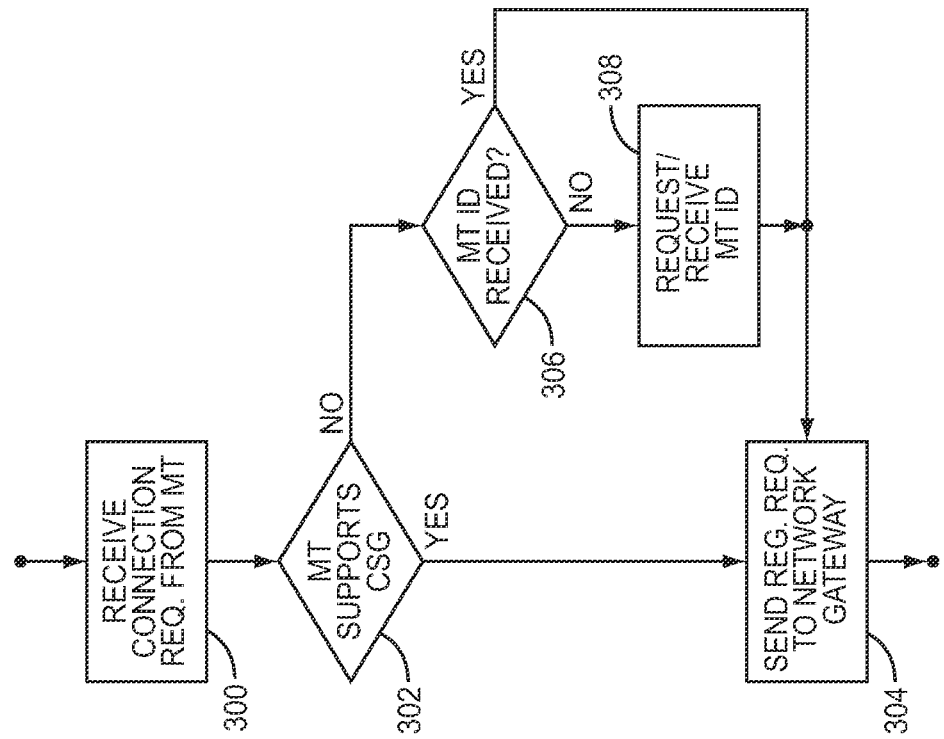
FIG. 3 is a logic flow diagram of one embodiment of Home NodeB (HNB) processing as contemplated herein.

FIGS. 3 and 4 illustrate example processing for a HNB 10 and a HNB GW 14, respectively, in accordance with the above teachings. It should be understood that the illustrated processing may be implemented in hardware, software, or some combination thereof. For example, the access controller 12 in a HNB 10 may comprise or at least include a microprocessor-based circuit, that includes program memory or other computer-readable medium, for storing a computer program comprising program instructions that, when executed by the microprocessor-based circuit, implement the illustrated processing of FIG. 3. Likewise, the registration controller 16 in a HNB GW 14 may comprise or at least include a microprocessor-based circuit that likewise includes or is associated with a computer-readable medium storing a computer program that, when executed by the microprocessor-based circuit of the registration controller 16, implements the illustrated processing of FIG. 4.

With these implementation examples in mind, the HNB processing of FIG. 3 "begins" with receiving a connection request from a given mobile terminal 20 (Block 300). The HNB 10 determines whether the mobile terminal 20 supports CSGs (Block 302), and, if so, it sends a registration request message to the HNB GW 14 (Block 304). On the other hand, if the received connection request does not indicate that the mobile terminal 20 supports CSGs, the HNB 10 determines whether the registration request includes a mobile terminal ID (Block 306). If no mobile terminal ID was received, the HNB 10 requests (and receives) a mobile terminal ID (Block 308), and then sends a registration request message to the HNB GW 14 (Block 304), where that message can include the mobile terminal ID, for use by the HNB GW 14.

Referring now to FIG. 4, one sees an example counterpart process at the HNB GW 14, wherein the HNB GW 14 receives an indication of CSG support for a given mobile terminal 20 (Block 400), and provides differentiated handling for mobile terminals 20 that are indicated as supporting CSGs versus those that are not. For example, in one or more embodiments, the HNB GW 14 receives such an indication as part of the registration request message sent to the HNB GW 14 from the HNB 10, for a given mobile terminal 20 attempting to connect through the HNB 10. The HNB GW 14 uses the indication to recognize whether the mobile terminal 20 supports CSGs (Block 402). If so, the HNB GW 14 defers access control for the mobile terminal 20 to the associated CN (Block 404). On the other hand, if the HNB GW 14 does not recognize the mobile terminal 20 as supporting CSGs, the HNB GW 14 performs access control for the mobile terminal 20 at the HNB GW (Block 406).

Figure 5:
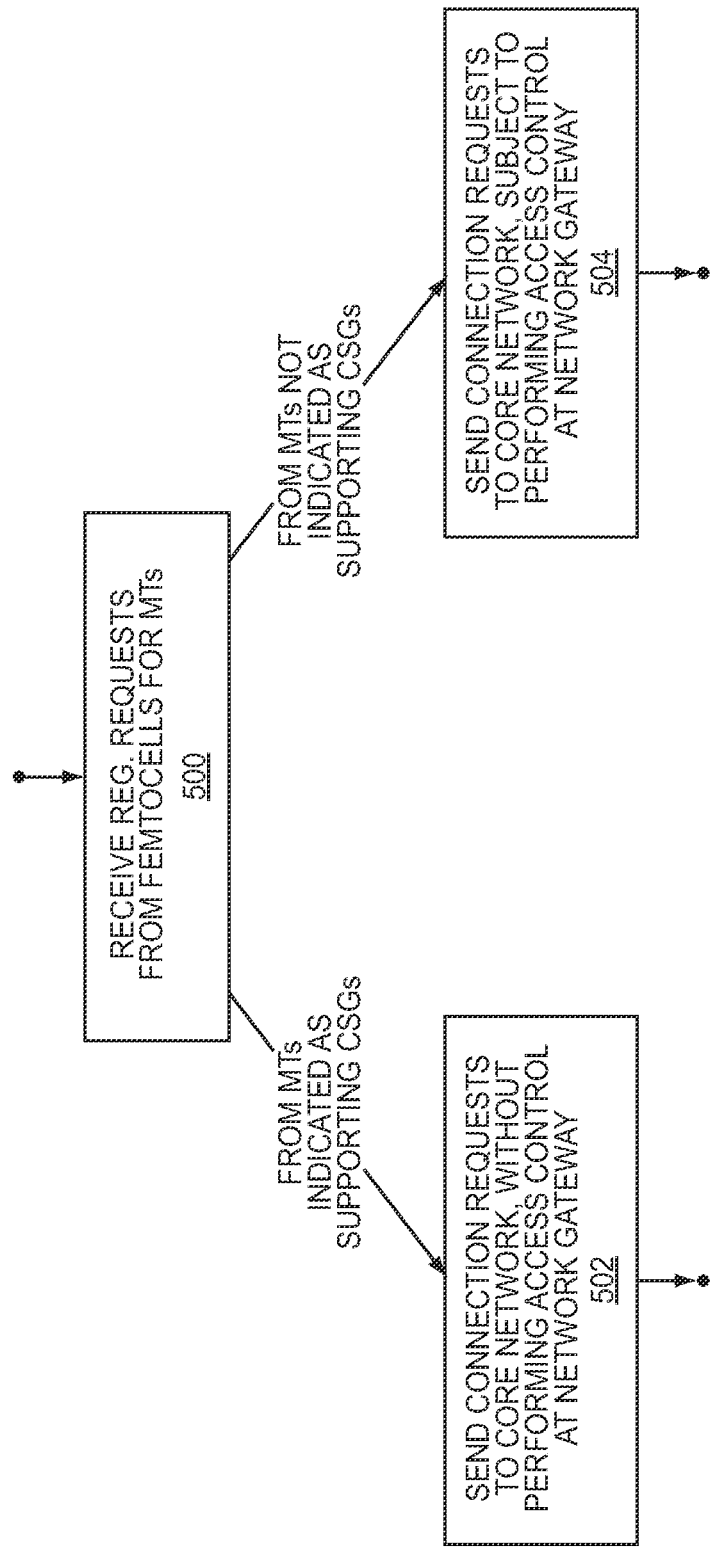
FIG. 5 is a logic flow diagram illustrating further HNB GW processing details.

FIG. 5 illustrates further HNB GW processing details, for at least one embodiment of the processing depicted in FIG. 4. In more detail, the HNB GW 14 receives registration requests from femtocells 24 for mobile terminals 20 (Block 500). For mobile terminals 20 indicated as supporting CSGs, connection requests are sent to the CN 22, without performing access control at the HNB GW 14 (Block 502). For example, the HNB GW 14 automatically sends a registration acceptance message in response to receiving a registration request sent to it from a given HNB 10 for a given mobile terminal 20 attempting to gain access through the given HNB 10, if the registration request message includes an indication that the mobile terminal 20 supports CSGs. In such cases, the HNB GW 14 forwards a connection request for the mobile terminal 20 to the CN 22, without actually determining whether the mobile terminal 20 has authorization to connect through the given HNB 10. Such authorization determination is, as noted earlier herein, deferred to the CN 22, as part of the CN's access control processing.

However, for mobile terminals 20 not indicated as supporting CSGs, the HNB GW 14 sends connection requests to the CN 22, subject to performing access control at the HNB GW 14 (Block 504). That is, in response to receiving a registration request from a given HNB 10 for a given mobile terminal 20 attempting to connect through the HNB 10, the HNB GW 14 performs access control. If access control processing at the HNB GW 14 determines that the mobile terminal 20 is authorized, the HNB GW 14 sends a connection request to the CN 22 for the mobile terminal 20. However, if authorization fails, the HNB GW 14 does not send the connection request to the CN 22 for the mobile terminal 20.

Figure 6:
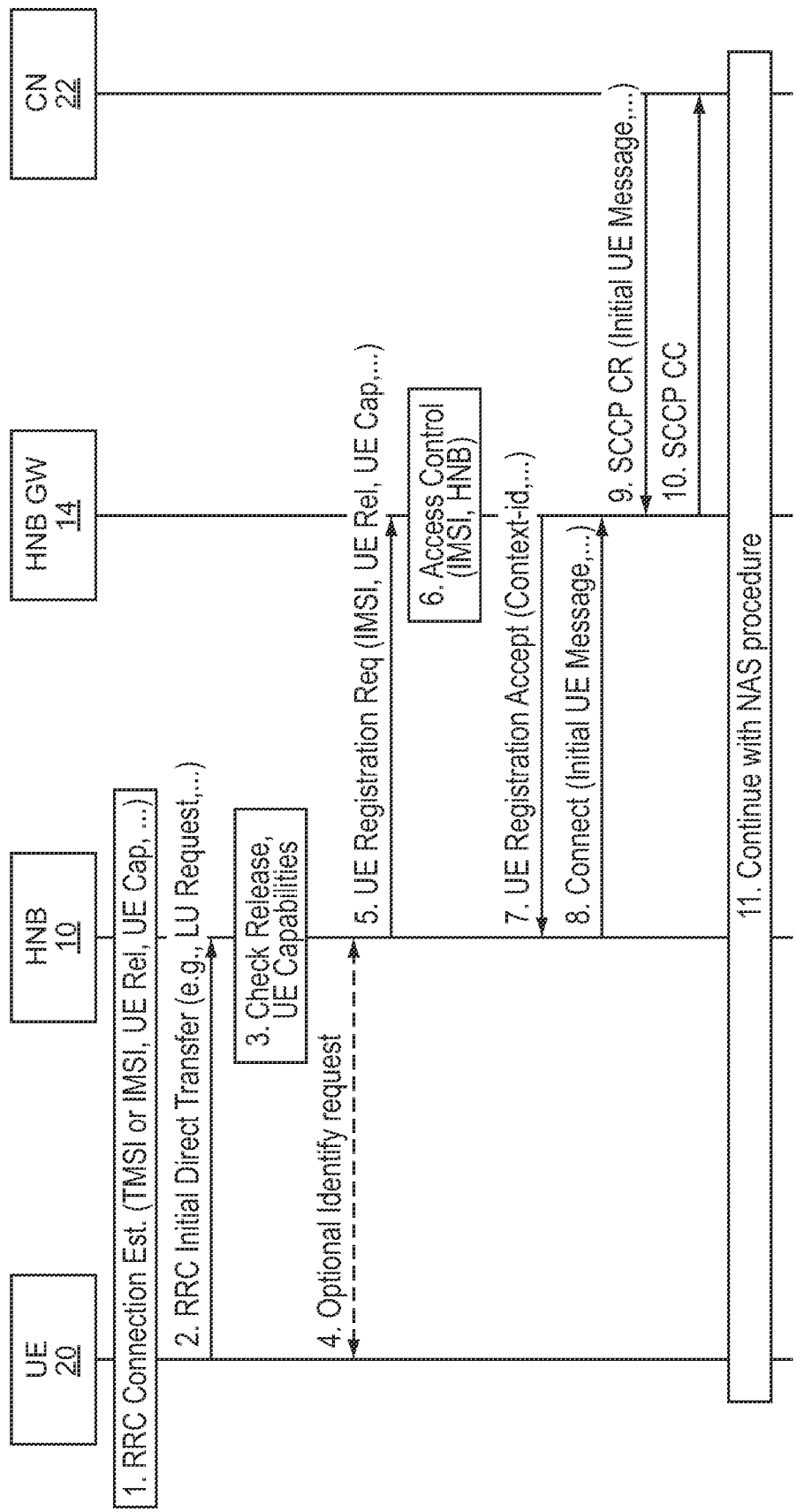
FIG. 6 is a processing flow diagram of one embodiment of registration processing for a UE that does not support CSGs.
Figure 7:
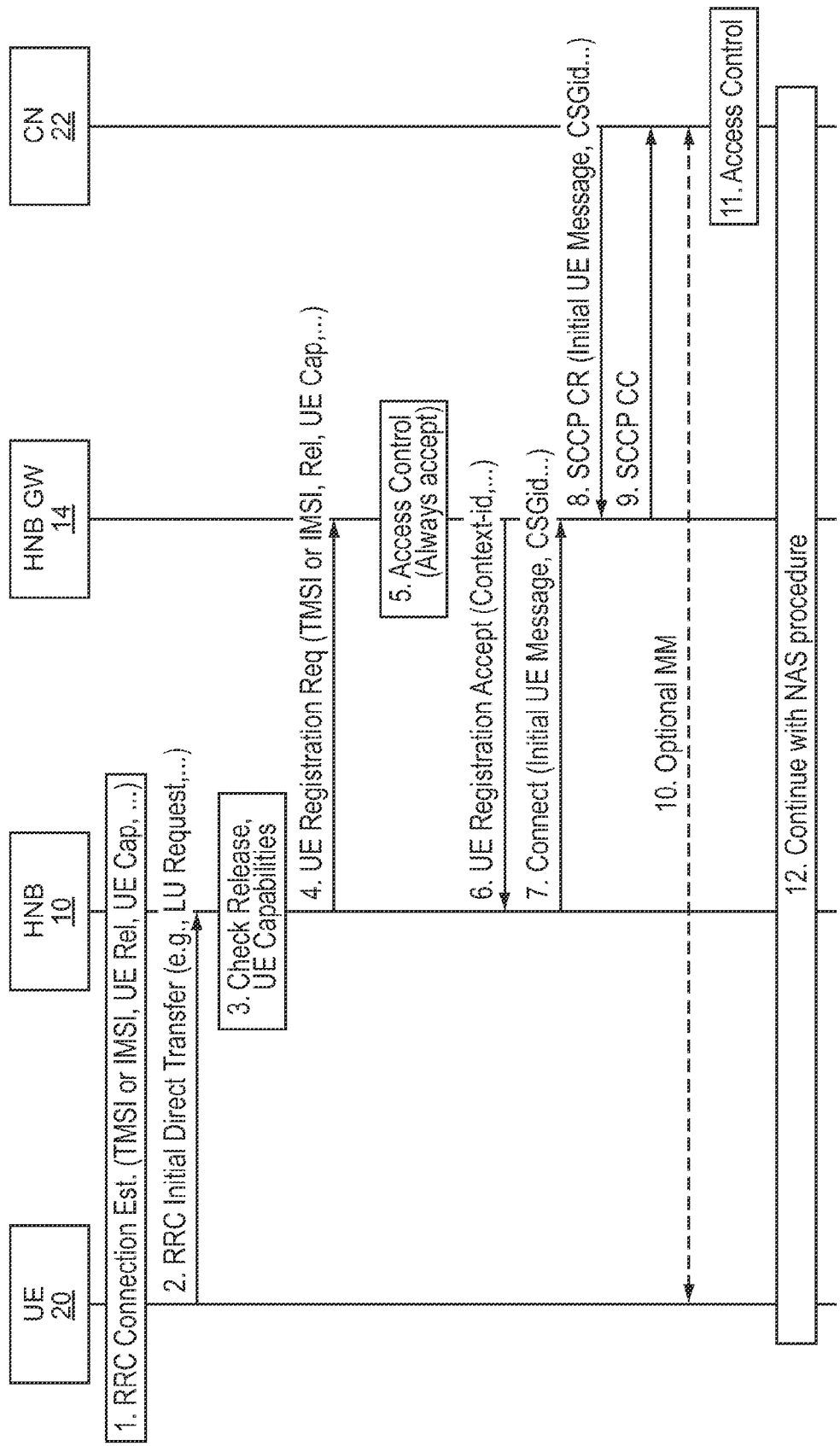
FIG. 7 is a processing flow diagram of one embodiment of registration processing for a UE that does support CSGs.

In turning to further non-limiting example embodiments, FIG. 6 illustrates access control operations as conducted by a HNB 10 and a HNB GW 14 according to the teachings herein. In particular, FIG. 6 presents a call/signal flow for one embodiment of the HNB 10 and HNB GW 14, in the case where a mobile terminal 20 (UE) attempting to gain connection is not indicated as supporting CSGs. In turn, FIG. 7 illustrates CSG-based access control operations where the terminal 20 is indicated as supporting CSGs.

In FIG. 6, a mobile terminal 20 initiates Radio Resource Control (RRC) connection procedures with the HNB 10 (Step 1). The terminal 20 further may initiate an upper layer procedure, e.g. initiate a Location Update, where the Initial Layer 3 message—e.g., a Location Update Request—is sent to the HNB 10 using RRC protocol mechanisms (Step 2). In any case, the initial connection messaging may include the terminal's ID, etc., along with one or more indicators as to UE capabilities. In particular, the presence or absence (or value) of one or more indicators provide the HNB 10 and/or HNB GW 14 with an indication as to whether the terminal 20 supports CSGs.

In the illustrated call flow, the HNB 10 recognizes that the terminal 20 does not support CSGs. Given that lack of CSG capability, the HNB 10 requests the terminal's ID (Step 3), or at least does so if no such ID was included in the initial RRC messaging. Then, the HNB 10 sends a registration request message to the HNB GW 14 (Step 4). That message includes UE ID, and one or more capability indicators that allow the HNB GW 14 to recognize that the terminal 20 does not support CSGs.

Based on that recognition, the HNB GW 14 performs access control for the terminal 20 (Step 5), rather than deferring CSG authorization to the CN 22. For example, the HNB GW 14 may use the terminal's IMSI, HNB IDs, and/or other information to verify that the terminal 20 is authorized. In so doing, the HNB GW 14 may access subscriber database information available in the CN 22, or elsewhere.

Assuming that access control processing at the HNB GW 14 (Step 6) indicates that access should be granted to the terminal 20, processing continues with the HNB GW 14 returning a registration acceptance message to the HBN 10 (Step 7). In turn, the HNB 10 responds with a connect message towards the HNB GW 14 (Step 8) that triggers the HNB GW 14 to send a connection request message for the terminal 20 towards the CN 22. For example, the HNB GW 14 sends a Signaling System 7 (SS7) Signaling Connection Control Part (SCCP) Connection Request (CR) message (Step 9), or other type of connection request message, as appropriate for the messaging protocols in use.

In response to receiving such a connection request message from the HNB GW 14, the CN 22 returns a connection confirmation to the HNB GW 14 for the session related to terminal 20. For example, the CN 22 returns a SCOP Connection Confirm (CC) to the HNB GW 14, the CN then performs access control—e.g., subscriber) authorization—for the terminal 20 and, assuming such authorization is successful, processing continues between the CN 22 and the terminal 20 (Step 10).

FIG. 7 is similar to FIG. 6, but illustrates an example flow for the case where the mobile terminal 20 does support CSGs. Jumping ahead to the points of distinction with respect to the processing flow of FIG. 6, one sees that the HNB 10 does not request UE ID, based on its recognition that the terminal 20 supports CSGs. As a further difference, one sees that Step 5 at the HNB GW 14 differs. In particular, the HNB GW registration request message received by the HNB GW 14 for the terminal 20 indicates that the terminal supports CSGs. As such, the HNB GW 14 defers actual CSG-based access control to the CN 22. Thus, Step 5 here is an "automatic" access control, where terminals 20 that are recognized as supporting CSGs are automatically accepted by the HNB GW 14. That is, while the messaging of Steps 6-9 are the same or similar to those steps as shown in FIG. 6, one sees that, here, the CN 22 is relied upon to perform access control processing for the terminal 20 (Step 11). Connection between the CN and the terminal 20 follows CN-based access control, assuming that such control determines that the UE belongs to a CSG of the HNB 10 (and assuming that any top-level subscriber authorization of the UE by the CN 22 is successful).

As part of the above processing flows, the HNB GW 14 is, in one or more embodiments, configured to inform the CN 22 about the need to perform CSG-based access control or not, for given terminals 20. Otherwise, there is the risk that neither the HNB GW 14 nor the CN 22 performs access control for a given terminal 20, or that both nodes perform access control, resulting in unnecessarily high resource utilization. There are different ways for the HNB GW 14 to indicate to the CN 22 as to whether it needs to perform access control for a given terminal 20. Non-limiting examples include adding a new information element (IE) to the Radio Access Network Application Part (RANAP) signaling in the Iu interface. The new IE indicates to the CN 22 whether access control has already been performed or not by the HNB GW 14, for a given terminal 20. The indication about whether such access control was performed at the HNB GW 14 can be "indirect." For example, the CSG-ID is only forwarded to the CN 22 from the HNB GW 14 in cases when there is need for the CN 22 to perform access control (i.e., in those cases where the HNB GW 14 did not perform such access control).

Further, an indicator that can be used to recognize whether a given mobile terminal 20 supports CSGs—e.g., an "Access stratum release indicator" or "UE capability indicator"—could be reported to the CN 22, as part of the Iu interface signaling. The CN 22 could use such an indicator as the basis for determining whether it should perform access control, based in its knowledge that the forwarding HNB GW 14 defers such authorization to the CN 22 for terminals 20 that are indicated as supporting CSGs. In such cases (and, practically, in all cases), it is also valuable for the HNB GW 14 to verify that the same UE capability indications or other values are used towards the HNB GW 14 and towards CN 22. Such verification avoids the possibility that different values are used towards the HNB GW 14 and CN 22, in an attempt to bypass access control mechanisms at the HNB GW 14 and CN 22.

Of course, it will be understood that the HNB GW 14 as contemplated herein also can be configured to provide registration and access control processing for HNBs 10 that do not support CSGs, such as by recognizing that case and carrying out the processing of FIG. 6, irrespective of whether a connecting mobile terminal 20 does or does not support CSGs. Finally, the above description is also based on the assumption that the HNB GW 14 performs the CSG-based access control. The described principles can also be used if such access control is performed in the HNB 10.

Still further, it was stated earlier herein that differentiated signaling between the HNB 10 and the HNB GW 14 can be used to implicitly indicate to the HNB GW 14 whether a given mobile terminal 20 supports CSGs. In one such embodiment, the HNB 10 recognizes whether a mobile terminal 20 attempting connection supports CSGs and the registration/connection signaling triggered by the HNB 10 towards the HNB GW 14 is differentiated in a manner that indicates such support (or lack thereof) to the HNB GW 14.

For example, a given mobile terminal 20 initiates connection with a HNB 10 and the HNB 10 recognizes whether the given mobile terminal 20 supports CSGs, from an indication included in the initial connection signaling from the mobile terminal 20 towards the HNB 10. If HNB 10 recognizes the terminal 20 as supporting CSGs, it sends a connect message to the HNB GW 14, without first sending a registration request message for the terminal 20. On the other hand, if the HNB 10 does not recognize the terminal 20 as supporting CSGs, the HNB 10 first sends a registration request message to the HNB GW 14, and does not send the connect message to the HNB GW 14 for the terminal unless the HNB GW 14 returns a registration accept message.

The HNB GW 14 thus can be configured to recognize the receipt of a connection message without first receiving a registration request as an implicit indication that the given mobile terminal 20 in question support CSGs. Conversely, the HNB GW 14 would recognize the receipt of a registration request message for a given terminal 20 as an implicit indication that the terminal 20 does not support CSGs.

Figure 8:
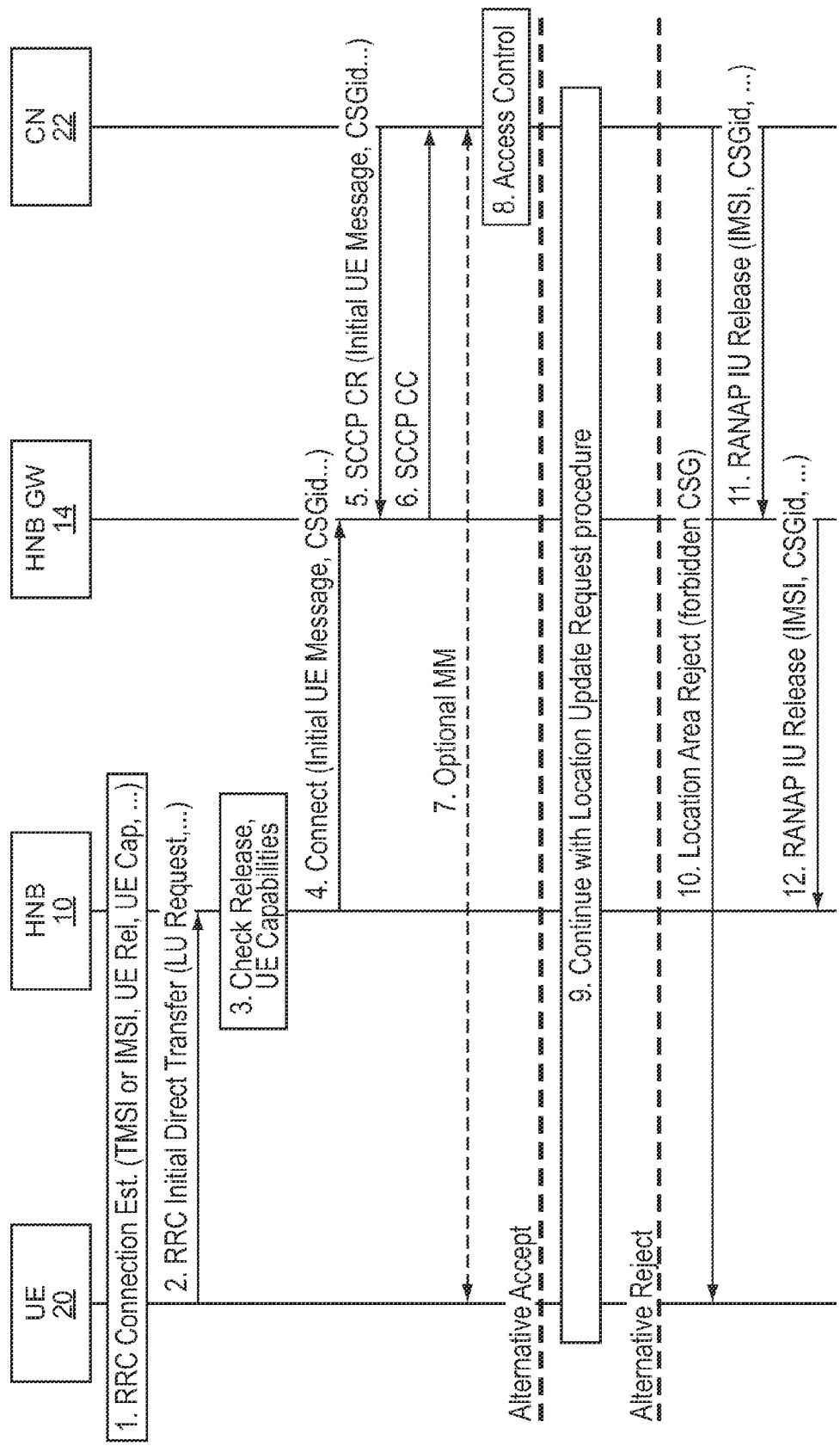
FIG. 8 is a processing flow diagram of another embodiment of registration processing for a UE that does support CSGs.

FIG. 8 illustrates a call flow for such an embodiment. In the illustrated processing, the HNB 10 checks one or more indicators to determine whether a mobile terminal 20 attempting connection supports CSGs. For example, if one or more indicators in the initial RRC signaling from the terminal 20 to the HNB 10 indicate that the terminal 20 supports CSGs, then the HNB 10 sends a Connect message, including the RANAP Initial UE message, to the HNB GW 14 (Step 4). One sees that this Step 4 differs from the registration request message sent in Step 4 of FIG. 7.

In particular, the HNB GW 14 for this processing embodiment is configured to interpret receipt of a Connect message from the HNB 10 for a given terminal 20, without first receiving a preceding Registration Request message from the HNB for that terminal 20, as an implicit indication that the terminal 20 supports CSGs. Based on recognizing this implicit indication of CSG support, the HNB GW 14 defers access control for the terminal 20 to the CN 22.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A femtocell base station configured to interface mobile terminals with a network gateway providing access to a core network of a wireless communication system, said femtocell base station comprising an access controller that is configured to:

receive a connection request from a given mobile terminal desiring access to the core network, said connection request including an indication of whether the mobile terminal supports closed subscriber groups;

request a mobile terminal identifier if the given mobile terminal does not support closed subscriber groups and if one was not received as part of the connection request; and send a registration request for the given mobile terminal to the network gateway responsive to receiving the connection request, and include in the registration request an indication of whether the given mobile terminal supports closed subscriber groups.

2. The femtocell base station of claim 1, wherein the femtocell base station comprises a Home NodeB configured to communicate with a Home NodeB Gateway as said network gateway.

* * * * *